July 9, 1935.   C. D. LAKE ET AL   2,007,375
PRINTING MECHANISM FOR ACCOUNTING MACHINES
Filed Sept. 9, 1933   3 Sheets-Sheet 2

July 9, 1935.          C. D. LAKE ET AL          2,007,375
PRINTING MECHANISM FOR ACCOUNTING MACHINES
Filed Sept. 9, 1933          3 Sheets-Sheet 3

INVENTORS
Clair D. Lake
George F. Daly
BY
ATTORNEY

Patented July 9, 1935

2,007,375

UNITED STATES PATENT OFFICE 2,007,375

PRINTING MECHANISM FOR ACCOUNTING MACHINES

Clair Dennison Lake, Binghamton, and George F. Daly, Johnson City, N. Y., assignors to International Business Machines Corporation, New York, N. Y., a corporation of New York Application September 9, 1933, Serial No. 688,728

8 Claims. (Cl. 235—92)

This invention concerns accounting machines and has for its principal object the provision of an improved and simplified total printing device. The disclosed total printing device is shown associated with a single set of accumulating wheels which receive credit and debit items and store the balance as a true number when the credit items predominate and as a complement when the sum of the debit items is greater than the sum of the credit items.

An object of the invention is to provide an electrically controlled read-out device for an accumulator or other entry receiving device in which the electrical controlling circuits are simplified over those previously in use.

A more specific object is to provide improved means for taking three different types of readings of an entry receiving and storing device and printing under control of said readings. A single reading means controls the printing of data identical to the data present in the device; inverts the reading of the device and controls the printing of a complement of the data read; or changes the reading of a portion of the device to control the printing of a different complement of the data read.

The invention is an improvement over the total taking mechanism shown and described in the copending application of C. D. Lake and G. F. Daly, Serial No. 590,848, filed February 4, 1932 and the read-out mechanism of the present invention may readily be substituted for that of the application.

The invention is illustrated as applied to an accumulator in which entries may be made in a manner set forth in detail in the application referred to. The particular manner of entering items forms no part of the invention and need therefore not be explained in detail further than to point out generally the general practice in electrically controlled accounting machines.

Debit and credit items are usually represented by perforations in index point positions indicative of true numbers whether negative or positive in value. The cards are analyzed singly by two sets of analyzing brushes past which they are moved in transit successively. As the cards pass the second set of brushes, circuits completed through the perforations at differential times serve to control the actuation of accumulator entering magnets to enter the values sensed into appropriate denominational orders of the accumulator.

Debit or negative items are first entered into a translating device which converts the true number into a complement and controls the entry of this complement into the accumulator. Frequently the debit item is perforated in the card as a complement, in which case this value can be entered directly into the accumulator without conversion.

After a number of credit and debit items have been entered, the accumulator will contain a balance which may be either a credit or a debit balance. If the debit items aggregate more than the credit items, the negative or debit balance is represented in the accumulator by its complement.

The devices of the present invention are concerned with the inverting of the complement in the accumulator during the taking of a total with a negative balance, in order to print a true number equal to the negative balance.

The device for inverting a complement in the accumulator during total taking includes a single impulse emitter operated in synchronism with the movement of the printing members and effective to stop the members in printing position by means of impulses initiated at differential times. The emitted impulses pass through devices adjusted by the accumulator and are selected according to such adjustment. Each denominational order element is provided with two pairs of brushes, contacting commutators connected to the emitters. One pair of brushes is arranged to represent by its setting, the actual position of the accumulator element while the second pair is concurrently set to represent a value one digit lower. Thus, if a 3 is entered in an accumulator element, one pair of brushes will be set at 3 and the other at 2. The pairs of brushes are selectively associated to cooperate with a single emitter so that impulses representative of the nines complement of the number will be selected by one pair of brushes and impulses representative of the tens complement will be selected by the other.

The emitter is arranged to emit impulses in either a normal order or in reversed order. The impulses emitted in normal order cooperate with one pair of brushes in each order of the accumulator to control printing of the number standing in the accumulator in the same value and the reversed impulses cooperate selectively with either pair of brushes to control printing of the complement of the number standing on the accumulator.

The accumulating elements are provided with means whereby the units order and any orders to the right of the first significant figure on the right of a number contained in the accumulator are adapted for selecting emitted impulses corresponding to the tens complement of the number registered on said lower order wheels, while the remaining higher order wheels are adapted to control the direction of impulses to the printing means, to cause the printing of the nines complement of the number standing on the higher order wheels. For example, it may be assumed that after a series of credit and debit entries, the number 999526300 is standing on the accumulator indicative of a negative balance. When the highest order is standing at "9", a negative balance is indicated. In order to print the balance as a true number, the three lowest order figures printed must be the tens complements of the numbers in the corresponding orders of the accumulator, and the six highest order figures must be converted to their respective nines complements.

The number 473700, which is printed under control of the total taking devices is the true negative balance.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

Figure 2:
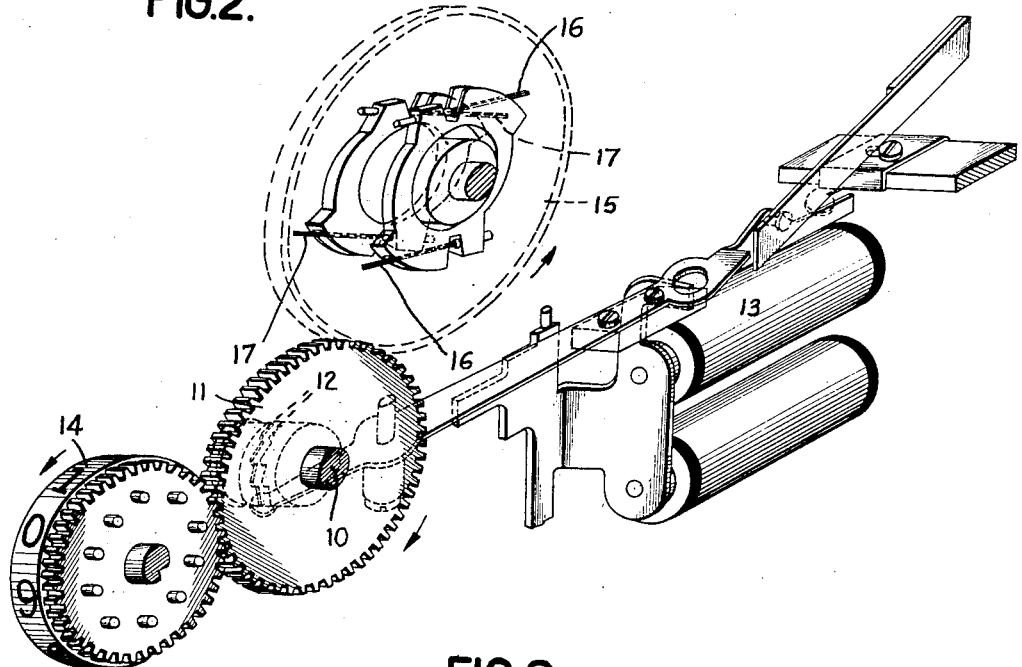
Fig. 2 is a perspective detail of a denominational order of the accumulator showing the entering mechanism therefor.
Figure 3:
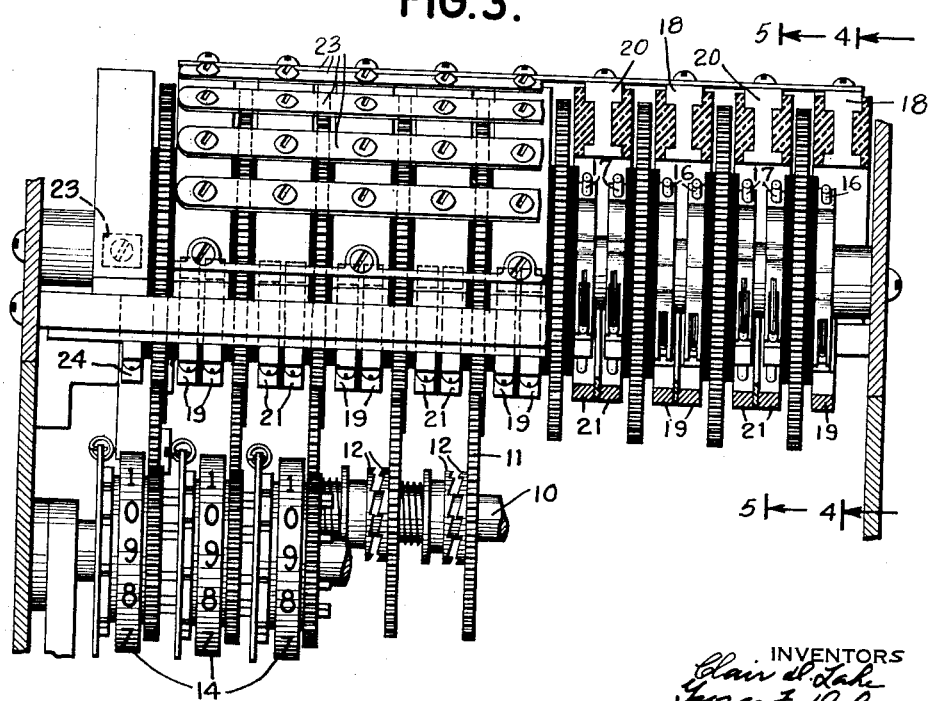
Fig. 3 is a detail view partly in section of the read-out devices which are positionable to represent the amount standing on the accumulator wheels.

The entry mechanism of the accumulator is shown in its essential elements in Figs. 2 and 3 where an operating shaft 10 is coupled to a gear 11 through a clutch generally designated at 12 at differential times and declutched at a fixed time in the operation of shaft 11. The entering magnet for effecting the coupling is shown at 13 and the accumulator index wheel at 14. The latter has ten positions indicative of the ten digits which may be presented in any order.

The detailed manner in which items are entered into the accumulator wheels forms, in itself, no part of the present invention and for further explanation, reference may be had to Patents No. 1,307,740, issued to C. D. Lake, June 24, 1919; No. 1,762,145, issued to G. F. Daly et al., June 10, 1930, in which data are entered directly into the accumulators from record cards. British Patent No. 273,731, dated October 1, 1928, shows how complements may be entered by means of translating devices and the copending application referred to also shows a well known method of additively and subtractively entering amounts into an accumulator.

The accumulator shown in Fig. 3 is provided with nine orders each of which includes a gear 11 which has driving connection with a gear 15 proportioned to rotate once for two complete revolutions of the index wheel 14. Each gear 15 carries a pair of electrically connected brushes 16 on one side thereof and insulated therefrom. On the opposite side of each gear is a second pair of similarly mounted brushes 17 which are set back 18 degrees or a twentieth of a revolution with respect to brushes 16.

Figure 4:
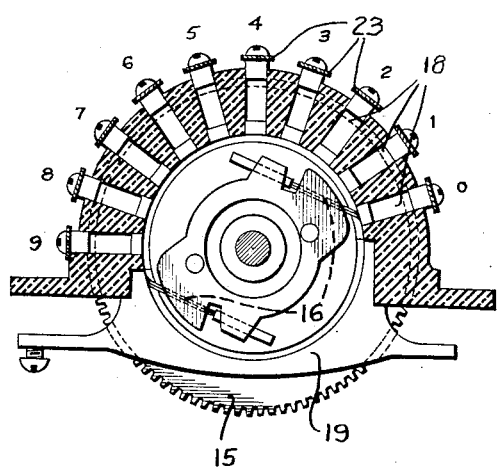
Fig. 4 is a detail taken along lines 4—4 of Fig. 3 showing the pair of brushes associated with the units order for representing the amount standing on that order.

The angular displacement of gear 11 and wheel 14 upon entry of a number, is accompanied by a corresponding angular displacement of gear 15 and brushes 16 and 17. Thus if a "6" is entered into an order, the brushes 16 and 17 will be rotated six steps or six twentieths of a revolution in a counterclockwise direction as viewed in Fig. 4.

Cooperating with brushes 16 is a commutator device comprising contact segments 18 (Fig. 4) and a common arcuate conductor 19 between which brushes 16 form an electrical connection. There are ten segments 18 numbered 0, 1, 2, 3 - - - 9 and one of the brushes 16 will contact with the segment 18 representing the setting of the accumulator wheel while the other brush contacts with conductor 19. Thus in Fig. 4, brushes 16 are positioned in accordance with the positioning of the accumulator wheel at zero.

Figure 5:
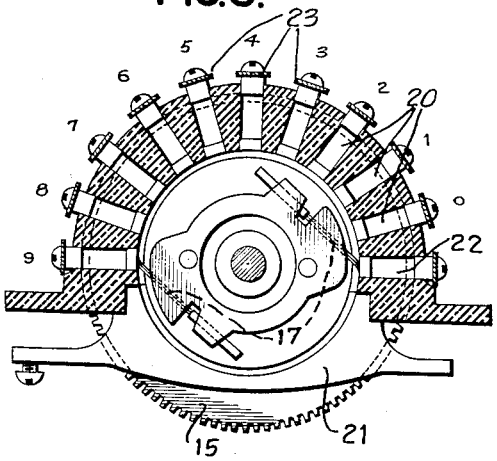
Fig. 5 is a detail taken along lines 5—5 of Fig. 3 showing the second pair of brushes associated with the units order and positionable one unit less than the first pair of brushes.

The brushes 17 cooperate with a similar set of contact segments 20 similarly arranged and numbered (Fig. 5) and form electrical connection between segments 20 and a common conductor 21. It will be noted in Fig. 5 that this connection is made only between segments 0–8 and conductor 21. A special segment 22 is provided with which one of the brushes 17 contacts when the other contacts the "9" segment 20. The reasons for this arrangement will be made apparent in the description of the circuit diagram, hereinafter. It was stated above that brushes 17 are angularly displaced one step behind brushes 16 so that with brushes 16 set at "0" as in Fig. 4, brushes 17 will take a position as in Fig. 5, bridging "9" segment 20 and the special segment 22.

Referring to Fig. 3 it will be observed that in the units, hundreds, etc., positions, brushes 16 are to the right of their supporting gears 15 and brushes 17 to the left, while in the tens, thousands, etc. positions, brushes 17 are to the left and brushes 16 to the right.

This arrangement permits the brushes 16 of two orders to cooperate with a single set of segments 18 and the brushes 17 of two orders to cooperate with a single set of segments 20, thus conserving space and simplifying the mechanical arrangement of the device. Connecting bars or strips 23 are provided to electrically connect all the like numbered segments 18 and 20 together, except in the "9" position where only the segments 18 are connected together.

The highest order position of the device is provided with a single segment 23 in the "9" position which is connected by brushes 17 in this order to a common conductor 24, whose configuration is the same as that of conductors 19.

Figure 6:
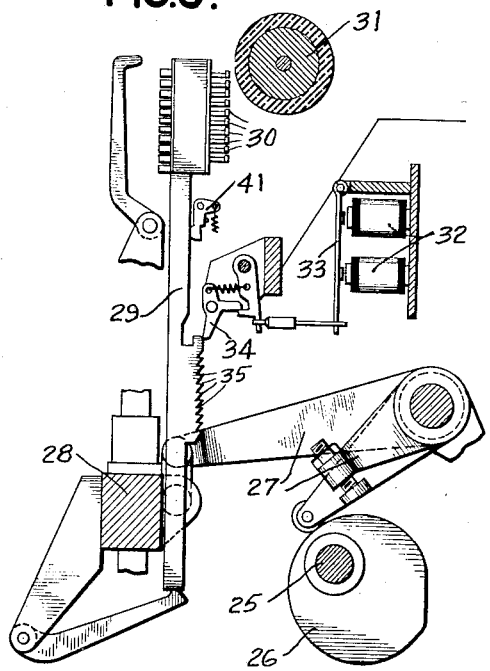
Fig. 6 is a detail of the essential elements of the printing mechanism.

The printing mechanism controlled by the above described devices will now be briefly described. In Fig. 6, the so-called total shaft 25 is rotated once for each total taking operation of the machine in a well known manner as set forth in the patents referred to and a cam 26 carried thereby causes operation of levers generally designated at 27 to reciprocate the printing crosshead 28. Supported on the crosshead are type bars 29 provided with type elements 30 which are moved in succession past printing platen 31. A bar 29 may be arrested in any position, during its upward movement under the control of a related printed magnet 32 which, when energized, attracts its armature 33 to release a stopping pawl 34 and permit it to engage a ratchet tooth 35 cut in bar 29. This prevents further upward movement of the bar and serves to hold a particular type element 30 in printing position.

The type for printing "9" is near the top of the bar, so that if an impulse is directed through magnet 32 early in the upward movement of the bar, the latter is intercepted in low position with the "9" type element opposite the platen. The other type are arranged in order on the bar with the "0" type at the bottom.

Figure 1:
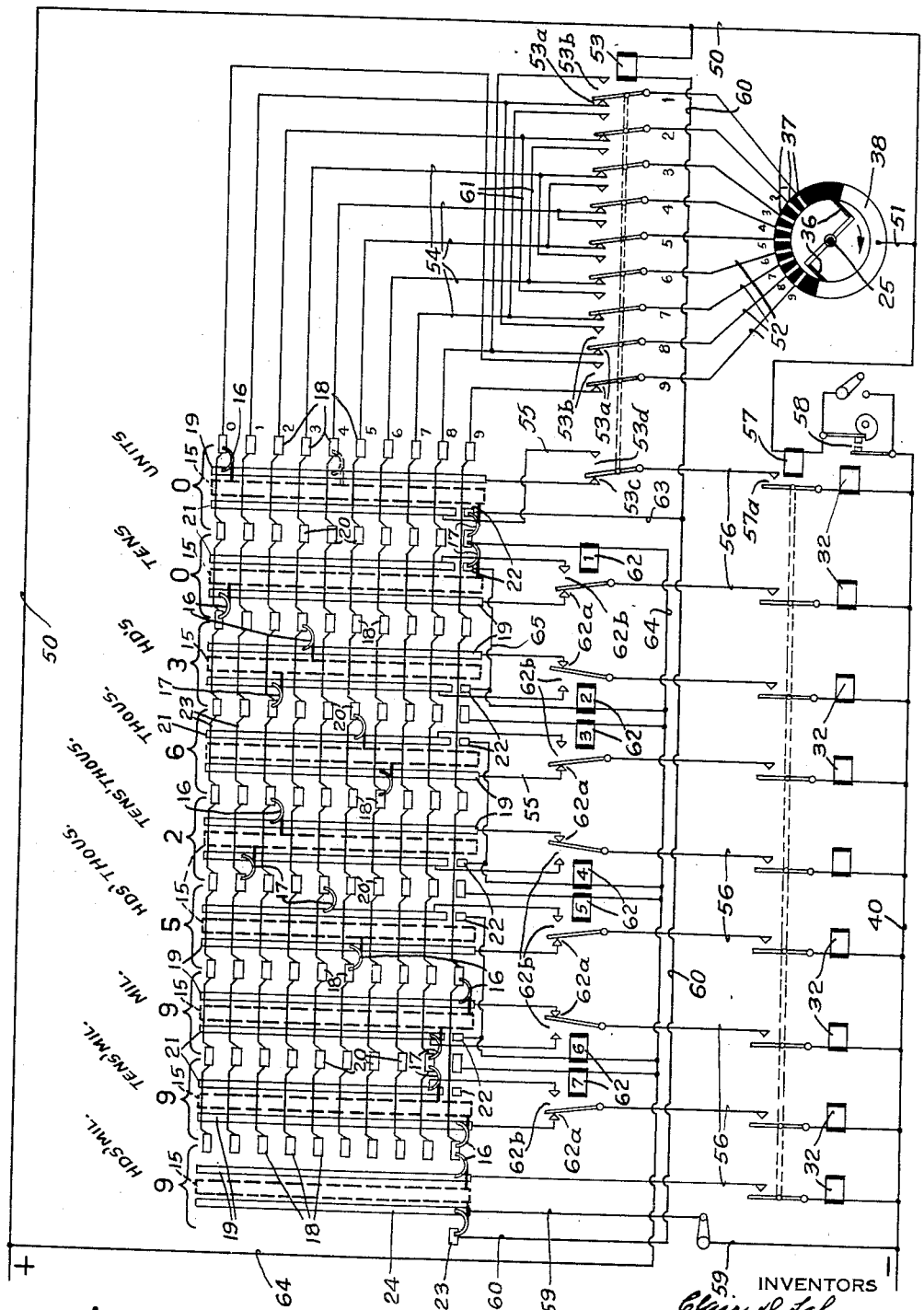
Fig. 1 is a wiring diagram of the electric circuits for reading out the amounts standing in a complete accumulator of nine denominational orders.

Carried by shaft 25 is an emitter brush structure 36 shown diagrammatically in the lower right hand corner of Fig. 1 which brushes successively connect a plurality of contact segments 37 with a common conductor 38 as the corresponding type elements reach printing position.

The complete operation of the device will now be explained in connection with the circuit diagram (Fig. 1) in which the read-out commutators have been diagrammatically shown with the common conductors 19 and 21 lying beside their related segments 18 and 20 and bridged by the brushes 16 and 17 respectively.

Printing a credit balance

The manner in which a credit balance is printed under control of the emitter will first be explained. If the number on the accumulator is a true number, it is to be printed directly in the same form and for this operation brushes 16 alone are utilized and a series of parallel circuits are completed, and through each order in which the brushes 16 are positioned to represent a significant figure. Since all the parallel circuits are traceable in the same manner, an explanation of a single one will suffice to make the entire operation clear.

Current is supplied to negative feed line 40 and positive feed line 50 from a suitable source. The common conductor 38 of the emitter is connected to line 50 through a wire 51 and the brushes 36 by successively contacting with segments 37 impress a series of impulses on wires 52 which are connected to normally closed contacts 53a of a relay magnet 53 which also connect to wires 54 terminating at segments 18 of the units order. By virtue of the connecting strips 23 the impulses follow through to all the segments 18 and 20 connected thereto. It will be noted that no segment 37, contacts 53a nor wires 52 or 54 are provided in the "0" position since zeros are not to be printed under control of the device but such might readily be included if desired. Zero printing is mechanically controlled by the printing bars themselves in the well known manner by means of the so-called zero pawls indicated at 41 in Fig. 6. By this means the type bar which prints the first significant figure on the right mechanically controls the positioning of the bars to its right in zero printing position.

Let us assume that in the units order the brushes 16 are set to represent a "4" and the brushes 16 are in the dotted line position as indicated in Fig. 1 wherein they bridge the "4" segment 18 and conductor 19 of the units order. The type elements are moving to printing position in synchronism with the contacting of brushes 36 with segments 37 so that as the "4" type element approaches the printing position the brushes 36 bridge the "4" segment 37 and conductor 38 and a circuit will be completed at that time which is traceable as follows:

From line 50, wire 51, conductor 38, brushes 36, "4" segment 37, "4" wire 52, "4" contacts 53a, "4" wire 54, "4" segment 18 in the units order, dotted brushes 16, conductor 19, wire 55, contacts 53c, wire 56, contacts 57a (now closed), print magnet 32 to line 40. Energization of magnet 32 at this time will intercept the associated type bar with the "4" type element in printing position.

In an exactly similar manner, parallel circuits are completed at differential times through the other orders under control of the setting of the corresponding brushes 16 to represent significant figures in such orders.

Contacts 57a are closed under control of a relay 57 which is energized throughout the type selecting portion of the printing cycle through a circuit completed by closure of cam contacts 58 controlled by a cam on shaft 25. The circuit is from line 40, contacts 58, magnet 57 to line 50.

Printing a debit balance

In Fig. 1 the brushes 16 and 17 are located to represent in full lines the differential positions they occupy when the complementary number 999526300 is standing on the accumulator. Under control of this setting, the true number 473700 is to be printed and the operation of the device to print this number will now be explained in detail. It is to be noted that the digit 3 standing in the hundreds order is to be complemented to ten and the higher orders complemented to 9. The zeros in the units and tens positions will be printed under control of the usual zero pawls in the printing mechanism. The nines complements will be controlled through brushes 16 and the tens complement will be controlled through brushes 17.

Let us first consider the digits to be complemented to nine. In the highest order the brushes 17 stand at "9" and bridge segment 23 and conductor 24, causing the completion of a circuit traceable from line 40, wire 59, conductor 24, brushes 17, segment 23, wire 60, magnet 53 to line 50. Energization of magnet 53 will cause opening of contacts 53a and closure of contacts 53b. This action causes a reversal of the circuit connections between wires 52 and 54 in accordance with a nines complementary arrangement; that is, the "9" wire 52 is now connected to the "0" wire 54, the "8" wire 52 is connected to the "1" wire 54, the "7" wire 52 to the "2" wire 54 and so on. Impulses will therefore be emitted to the segments 18 and 20 in inverse order and as the "9" type elements approach printing position the "0" segments 18 and 20 receive an impulse and so on until finally as the "1" type element reaches printing position the "8" segments 18 and 20 receive an impulse. The "9" segments 18 and 20 will, of course, receive no impulse and the type bars to the left of the highest significant figure are not interrupted so that they rise to a nonprinting position. The circuit through the thousands order, for example, may be traced as follows to cause the printing of a "3" under control of the brushes 16 set in this position at "6". From line 50, wire 51, conductor 38, brushes 36, "3" segment 37, "3" wire 52, "3" contacts 53b, wire 61, "6" wire 54, "6" connecting strip 23, "6" segment 18 in the thousands order, brushes 16, conductor 19, thousands wire 55, contacts 62a, wire 56, print magnet 32 to line 40. Since the "3" type element 30 is in printing position at this time, it will be selected for printing. The brushes 16 set at "5" and "2" in the next higher orders will in a similar manner control the completion of circuits at the "4" and "7" points in the cycle to select the "4" and "7" type elements respectively.

Since the brushes 17 are offset angularly with respect to brushes 16, which in the units and tens position are set at "0", the corresponding brushes 17 will bridge segments 22 and the "9" segment 20 in these positions and concurrently with the energization of relay segment 53 a circuit is completed from line 40, wire 59, conductor 24, brushes 17 in the highest order, segment 23, wire 60, wire 63, units order segment 22, units brushes 17, "9" segment 20, relay magnet 62 farthest to the right, wire 64, to line 50. A branch circuit continues from "9" segment 20, brushes 17 of the tens order, segment 22 of the tens order wire 65, second relay magnet 62, wire 64 to line 50. Magnets 62 open their contacts 62a and close contacts 62b, thus disconnecting the conductors 19 in the tens and hundreds orders from wires 56 and connecting conductors 21 thereto. In the units order, this shifting of the wire 56 from connection with conductor 19 to conductor 21 is effected by relay magnet 53 which opens its contacts 53c and closes its contacts 53d.

During the operation of the emitter, no circuits will be completed through the units and tens orders since there is no brush connection 17 to the conductors 21 in these orders. In the hundreds order, however, the offset brushes 17 are set at the "2" segment and a circuit will be completed to select the "7" type element which is the nine complement of 2 but is also the tens complement of the setting of the hundreds order, namely "3". This circuit is traceable as follows: from line 50, wire 51, conductor 38, brushes 36, "7" segment 37, "7" wire 52, "7" contacts 53b, wire 61, "2" wire 54, "2" connecting strip 23, "2" segment 20 in the hundreds order, brushes 17, conductor 21, contacts 62b (now closed), wire 56, print magnet 32 to line 40. In this fashion, the tens complement of the lowest order significant figure is selected for printing.

It is apparent from the foregoing that impulses transmitted over wires 54 from the emitter are selected by the accumulator elements to effect reading out either the true setting of the element, its nines complement or its tens complement.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a read-out device for an accumulator, commutator devices adjusted in accordance with the amount standing in the accumulator, an emitter adapted to send impulses through said commutators either at times corresponding to the setting of the commutators or at times complementary to the setting of the commutators, means for causing the emitter to send either type of impulses, a printing device, and means for operating said printing device under control of the selected impulses.

2. In a read-out device for an accumulator, commutator devices adjusted by the elements of an accumulator to represent the amount entered therein, an emitter adapted to send differentially timed impulses through said commutator devices to control printing devices operating in synchronism with said emitters and timed to operate the printing devices to print a number corresponding to the setting of the commutators, a circuit shifting device adapted to cause said emitter to send impulses inversely timed to control the printing devices to print the complement of the number corresponding to the setting of the commutators, and means controlled in accordance with the setting of one of the commutator devices for causing an operation of said shifting device.

3. In a machine of the class described, an accumulator comprising a plurality of accumulating elements, means for entering amounts therein, a single means for taking an inverted nines complement reading and an inverted tens complement reading of said elements, means under control of the element to the right of the element containing the first significant figure on the right for causing said means to take a tens complement reading of the element containing the first significant reading and to take a nines complement reading of the elements of higher order.

4. In a machine of the class described, an accumulator comprising a plurality of accumulating elements, adjustable to receive numbers, two commutator devices settable by each element, one representing the digit standing on the element and the other representing the next adjacent digit, a single emitter for sending differentially timed impulses through said devices, printing devices, means controlled by one of said elements for selecting one of said commutator devices for cooperation with said emitter and means controlled by the selected commutator device for controlling the operation of said printing device in accordance with the setting of said selected device.

5. In a machine of the class described, an accumulator comprising a plurality of accumulating elements adjustable to receive numbers, two commutator devices for each element settable by the element, one representing the digit standing on the element and the others representing the next adjacent digit, a single emitter for sending differentially timed impulses through said devices, means for selecting either of said commutator devices for cooperation with said emitter, one of said commutator devices being adapted to select impulses corresponding to the nines complement of the number standing on the related element and the other being adapted to select impulses corresponding to the tens complement of the number standing on the related element, printing mechanism and means controlled by the selected commutator device for causing said mechanism to print either the nines complement or the tens complement of the number standing on the element.

6. In a machine of the class described, an accumulating device comprising a plurality of denominational order elements for receiving and accumulating numerical data, a printing device for reading the data standing thereon, an emitter for emitting a single series of impulses representative of the several digits and means associated with the accumulating device for selecting for control of the printing device in one denominational order only, the digit impulse corresponding to the tens complement of the numerical value represented in that order and for selecting for control of another order only the digit impulse corresponding to the nines complement of the numerical value represented in said other order.

7. In a machine of the class described, an accumulating device comprising a plurality of denominational order elements for receiving and accumulating numerical data, a printing mechanism for receiving the data standing thereon, an emitter for emitting a single series of impulses representative of the several digits, means associated with each element for selecting either the digit impulse corresponding to the nines complement or the tens complement of the numbers standing in said elements and means for causing one of the selected impulses in each order to control said printing mechanism.

8. In a machine of the class described, an accumulating device comprising a plurality of denominational order elements for receiving and accumulating numerical data, a printing mechanism, a single group of control circuits representative of the several digits, means for selectively connecting each element to the circuit corresponding either to the number standing on the element, the nines complement thereof or the tens complement and means controlled by the selected circuit for operating said printing mechanism.

CLAIR DENNISON LAKE.
GEORGE F. DALY.